(12) United States Patent
Wang et al.

(10) Patent No.: US 6,706,823 B2
(45) Date of Patent: Mar. 16, 2004

(54) CONDUCTIVE GELS

(75) Inventors: Xiaorong Wang, Hudson, OH (US);
Victor J. Foltz, Akron, OH (US);
James E. Hall, Mogadore, OH (US)

(73) Assignee: Bridgestone Corporation, Tokyo (JP)

( * ) Notice: Subject to any disclaimer, the term of this patent is extended or adjusted under 35 U.S.C. 154(b) by 16 days.

(21) Appl. No.: 10/039,008

(22) Filed: Dec. 31, 2001

(65) Prior Publication Data

US 2003/0130397 A1 Jul. 10, 2003

(51) Int. Cl.$^7$ ................................................. C08L 79/08
(52) U.S. Cl. ........................ 525/422; 525/539; 525/540; 524/555; 524/538; 524/606; 524/608; 524/438
(58) Field of Search ....................... 525/539, 422, 525/540; 524/438

(56) References Cited

U.S. PATENT DOCUMENTS

| | | | |
|---|---|---|---|
| 4,247,434 A | 1/1981 | Lovelace et al. | 260/29.6 RB |
| 4,374,910 A | 2/1983 | Glugla | 429/197 |
| 4,829,135 A | 5/1989 | Gunesin et al. | 526/173 |
| 4,942,209 A | 7/1990 | Gunesin | 526/173 |
| 4,983,690 A * | 1/1991 | Cameron et al. | 525/436 |
| 5,114,811 A | 5/1992 | Ebel et al. | 429/194 |
| 5,262,483 A * | 11/1993 | Jongeling | 525/185 |
| 5,331,035 A | 7/1994 | Hall | 524/457 |
| 5,336,712 A | 8/1994 | Austgen, Jr. et al. | 524/530 |
| 5,378,560 A * | 1/1995 | Tomiyama | 429/217 |
| 5,395,902 A | 3/1995 | Hall | 526/201 |
| 5,421,982 A * | 6/1995 | Ikeda et al. | 204/414 |
| 5,614,579 A | 3/1997 | Roggeman et al. | 524/457 |
| 5,639,574 A | 6/1997 | Hubbard et al. | 429/192 |
| 5,688,856 A | 11/1997 | Austgen, Jr. et al. | 524/505 |
| 5,730,890 A | 3/1998 | Bickford et al. | 216/87 |
| 5,763,551 A | 6/1998 | Wünsch et al. | 526/201 |
| 5,847,054 A | 12/1998 | McKee et al. | 525/314 |
| 5,874,185 A * | 2/1999 | Wang et al. | 429/192 |
| 5,891,947 A | 4/1999 | Hall et al. | 524/457 |
| 5,952,126 A | 9/1999 | Lee et al. | 429/314 |
| 5,965,300 A | 10/1999 | Lee et al. | 429/314 |
| RE37,700 E * | 5/2002 | St. Aubyn Hubbard et al. | 429/300 |
| 2003/0130397 A1 * | 7/2003 | Wang et al. | 524/430 |

FOREIGN PATENT DOCUMENTS

| | | | | |
|---|---|---|---|---|
| GB | 2 260 137 A | * | 4/1993 | H01M/6/14 |
| JP | 8-73756 A | * | 3/1993 | C08L/101/14 |
| JP | 9-500485 | | 1/1997 | |
| JP | 9-259923 | | 10/1997 | |
| JP | 11-265616 A | * | 9/1999 | H01B/1/12 |
| JP | 11-290286 A | * | 10/1999 | A61B/5/0408 |

OTHER PUBLICATIONS

Vermeesch et al. Macromolecules 1993, 26, 6643–6649.*
Macromolecules, 26, 6643–6649 (1993).
Chemical & Engineering News, Oct. 13, 1997, p. 22–23.
Macromol. Sym. 114, 85–95 (1997).
European Polymer Journal, 35, 789–793 (1999).
Macromolecules 32, 1541–1548 (1999).
Advances in Polymer Science, 135, 139–204 (1998).

* cited by examiner

*Primary Examiner*—David W. Wu
*Assistant Examiner*—Rip A. Lee
(74) *Attorney, Agent, or Firm*—Scott A. McCollister; Meredith E. Palmer

(57) ABSTRACT

A conductive polymer gel composition including a copolymer with alkenyl monomer units and maleimide monomer units, a crosslinking agent, and an electrolyte solution. The conductive polymer has a current resistance less than or equal to $10^{-4}$ ohms and can be used to provide electrolyte cells.

20 Claims, No Drawings

CONDUCTIVE GELS

BACKGROUND OF THE INVENTION

The present invention relates to polymer gels with conducting capabilities.

Storage cells that can provide power for electronic apparatus, particularly portable apparatus, such as cell phones, notebook computers, and photographic equipment, have become regular necessities of the modern world. Lithium secondary cells for such a product have become increasingly popular. As a cathode, lithium cobalt oxide, lithium nickel oxide, and lithium magnesium oxide have been used. As an anode, lithium metal or carbon alloys are often used. A liquid electrolyte is also typically used. A damaged cell may leak liquid electrolyte, rendering the power cell useless and potentially damaging the electronic apparatus. Accordingly, solid polymer electrolytes have been investigated.

Considerable effort has been expended to provide solid or highly viscous polymeric electrolytes that contain a salt and display mobility, under appropriate conditions, of at least some of the ionic species present. In fact, polymer salt complexes and polymer salt plasticizing agents with good conductivity levels have been made. However, these compounds generally demonstrate conductivity levels too low for commercial applications.

It would therefore be desirable to develop an easily formed conductive polymer gel that demonstrates high ionic conductivity.

SUMMARY OF THE INVENTION

The present invention provides a conductive polymer gel including a copolymer having alkenyl monomer units, preferably selected from vinyl-substituted aromatic hydrocarbon, $R^1R^2$ethylene, and/or alkyl vinyl ether, and maleimide monomer units. The composition further includes a crosslinking agent and an electrolyte solution containing at least one inorganic salt. The conductive soft polymer gel has a current resistance less than or equal to $10^{-4}$ Ω, preferably less than or equal to $10^{-5}$ Ω.

A method for forming a conductive polymer gel is provided. The method includes forming a copolymer having alkenyl monomer units and maleimide monomer units, crosslinking the copolymer, and mixing the copolymer with an electrolyte solution.

The present invention also provides an electrolytic cell. The electrolytic cell includes an anode, a cathode, and a polymer gel. The polymer gel includes a copolymer with alkenyl monomer and maleimide monomer units, a multi-functional crosslinking agent, and an electrolyte solution containing at least one inorganic salt.

The following definitions apply herein throughout unless a contrary intention is expressly indicated:

"vinyl aromatic hydrocarbon" and "alkenyl benzene" are used interchangeably;

"maleic anhydride" encompasses dicarboxylic acids, including maleic anhydride that can form a copolymer with an alkenyl benzene, an $R^1R^2$ethylene, or an alkyl vinyl ether, the copolymer having dicarboxylic acid units capable of reaction with an amine functional group;

"maleimide" encompasses the reaction product of an amine and the dicarboxylic acids described above;

"$R^1R^2$ethylene" encompasses compounds of the general formula:

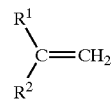

where $R^1$ and $R^2$ are the same or different substituents on the same or different carbon atoms of the ethylene group, and are independently H or substituted $C_1$–$C_{20}$ alkyl groups; and poly(alkenyl-co-maleimide) includes, for example, poly(alkenylbenzene-co-maleimide), poly($R^1R^2$ethylene-co-maleimide), and poly(alkyl vinyl ether-co-maleimide).

DETAILED DESCRIPTION OF ILLUSTRATIVE EMBODIMENTS

The conductive polymer gel composition of the present invention includes a copolymer, an electrolyte solution, and a crosslinking agent. The copolymer is a poly(alkenyl-co-maleimide), the electrolyte solution contains an inorganic salt, and the crosslinking agent is a multi-functional organic compound.

The poly(alkenyl-co-maleimide) contains alkenyl contributed monomer units chosen from vinyl-substituted aromatic hydrocarbon, $R^1R^2$ ethylene, and/or alkyl vinyl ether. The copolymer further includes maleimide contributed monomer units.

Poly(alkenyl-co-maleimide) and poly(alkenyl-co-maleic anhydride) encompass random and stereospecific copolymers, including copolymers having a backbone with alternating alkenyl-contributed units (i.e., monomer units derived from an alkenyl group such as styrene) and maleimide- or maleic anhydride-contributed units (i.e., monomer units derived from a maleimide or a maleic anhydride). Such alternating structures typically are described as poly(alkenyl-alt-maleimide) and poly(alkenyl-alt-maleic anhydride); however, these polymers are encompassed within the terms poly(alkenyl-co-maleimide) and poly(alkenyl-co-maleic anhydride). Exemplary copolymers include copolymers with a ratio of about 50% alkenyl contributed monomer units and about 50% maleimide contributed monomer units. However, copolymers with at least about 20% alkenyl contributed monomer units are contemplated for use.

Preferred vinyl-substituted aromatic hydrocarbon contributed monomer units of a poly(alkenylbenzene-co-maleimide) are preferably derived from one or more of styrene, α-methylstyrene, 1-vinyl-naphthalene, 2-vinyl-naphthalene, 1-α-methyl vinyl naphthalene, 2-α-methyl naphthalene, as well as alkyl, cycloalkyl, aryl, alkaryl, and aralkyl derivatives thereof, in which the total number of carbon atoms in the combined hydrocarbon is generally not greater than 18, as well as any di- or tri-vinyl aromatic hydrocarbons. Preferred vinyl aromatic hydrocarbons include styrene and/or α-methyl styrene.

Preferred $R^1$ and $R^2$ groups of $R^1R^2$ethylene contributed monomer units and the alkyl groups of said alkyl vinyl ether contributed monomer units are independently selected from methyl, ethyl, propyl, isopropyl, butyl, isobutyl, pentyl, isopentyl, hexyl, heptyl, octyl, nonyl, decyl, undecyl, dodecyl, tredecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyoctyl, methoxynonyl, ethoxydecyl, ethoxymethyl, ethoxyethyl, ethoxypropyl, ethoxybytyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyheptyl, propoxyoctyl, propoxynonyl, propoxydecyl, butoxymethyl, butoxyethyl, butoxypropoyl, butoxybutyl, butoxypentyl, butoxyhexyl, butoxygeptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, heptyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxyoctyl, octyloxynonyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-bethylpentyl, 2-methylhexyl, 2-methylheptyl, 2-methyloctyl, 2,3,3-trimethylbutyl, 3-methylpentyl, 2,3-dimethylpentyl, 2,4-dimethylpentyl, 2,3,3,4-tetramethylpentyl, 3-methylhexyl, or 2,5-dimethylhexyl.

Preferred $R^1R^2$ethylene contributed monomer units of the poly($R^1R^2$ethylene-co-maleimide) include alkenes such as ethylene, propylene, butylene, isobutylene, pentene, hexene, heptene, etc., as well as any di- or tri-alkene, or mixtures thereof, with preference given to isobutylene.

Preferred alkyl vinyl ether contributed monomer units of the poly(alkyl vinyl ether-co-maleimide) include any alkyl vinyl ether such as methyl vinyl ether, ethyl vinyl ether, propyl vinyl ether, butyl vinyl ether, and any other alkyl vinyl ether wherein the number of carbons in the alkyl substituent is not greater than about 12, and mixtures thereof. A preferred alkyl vinyl ether is methyl vinyl ether.

The poly(alkenyl-co-maleimide) can be formed by reacting a poly(alkenyl-co-maleic anhydride) in the presence of ammonia at temperatures from about 100° C. to about 300° C. and at a pressure from about slightly above vacuum to about 2000 kPa, under substantially dry conditions. Alternatively, the poly(alkenyl-co-maleic anhydride) may be mixed with a primary amine. The poly(alkenyl-co-maleic anhydride) may be prepared by any means known in the art for forming copolymers. Free radical polymerization is preferred, but other means are contemplated. The individual monomer units may be distributed in any of a random or alternating arrangement along the polymer backbone. Furthermore, the backbone may be linear or branched. The poly(alkeneyl-co-maleic anhydride) and ammonia are preferably dry mixed in the absence of solvents in a suitable mixing apparatus such as a Brabender mixer. Purging the mixer with $N_2$ prior to charging of the reactants can be beneficial. The primary amine or ammonia may be added in a single charge, or in sequential partial charges into the reactor containing a charge of poly(alkenyl-co-maleic anhydride). Preferably, the primary amine or ammonia is charged in a ratio of between about 0.8 to 1.0 moles of nitrogen (in the primary amine or ammonia) per monomer contributed units of maleic anhydride in the poly(alkenyl-co-maleic anhydride).

Suitable primary amines include but are not limited to alkyl amines; alkyl benzyl amines; alkyl phenyl amines; alkoxybenzyl amines; allyl aminobenzoates; alkoxy aniline; and other linear primary amines containing from 1 to about 50 carbon atoms, preferably about 6 to about 30 carbon atoms in the alkyl and alkoxy substituents in these primary amines. The alkyl and alkoxy substituents of the primary amines can be linear or branched, preferably linear, and saturated or unsaturated, preferably saturated. Exemplary amines include hexylamine, octylamine, and dodecylamine. Ammonia is the most preferred nitrogen source due to the improved solubility of the resulting product in the electrolyte solutions.

The poly(alkenyl-co-maleimide) preferably has a weight-average molecular weight ($M_w$) between about 10,000 and 500,000, more typically between about 150,000 and 450,000.

After the poly(alkenyl-co-maleimide) is formed, it is dissolved in a solvent used to form the electrolyte solution. Exemplary solvents include a poly(ethylene oxide) solvent, such as poly(ethylene glycol), polypropylene carbonate, diethyl phthalate, 12-crown-4-ether, and mixtures thereof. Preferably, the solvent will be a low molecular weight oligomer, such as a poly(ethylene oxide), with $M_w$ less than about 10,000, preferably less than about 1000. Preferably, the content of the solvent is within the range of from about 10 to 99% by weight of the total solution, more preferably between about 20 and 95%.

After the addition of solvent to form a polymer solution, an inorganic salt capable of acting as an extender can be dissolved in the polymer solution to form an electrolytic polymer solution. (The salt also can be added to the polymer prior to addition of solvent.) The inorganic salt one which is preferably dissociates into positive and negative ions when dissolved in the solvent. The dissociated ions move freely within the space of the polymer matrix to provide the conductivity of the electrolyte.

Suitable inorganic salts include lithium perchlorate, $LiBF_4$, lithium trifluoromethansulfonate, lithium hexafluorophosphate, lithium bistrifluoromethansulfonylamide, LiI, LiBr, $LiAlCl_4$, lithium hexafluoroarsenate, lithium hexafluorophosphate, lithium tetramethyl borate, and lithium oxide aluminium chloride complex salt. A preferred inorganic salt is $LiBF_4$.

Preferably, the content of the inorganic salt is within the range of from about 0.01 to 40% by weight of the total composition, most preferably between about 0.1 and 20%.

The electrolytic polymer solution is then mixed with a crosslinking agent to form the conducting gel. Physical linkages or microcrystalline linkages both can be employed to crosslink the polymer, either independently or conjunctively. Preferred materials capable of providing physical crosslinks include di-halo alkanes and bifunctional phthalic acids. The di-halo alkanes include di-bromo alkane, di-chloro alkane, di-fluoro alkane, and di-iodo alkane. A preferred halogen group is bromine. An alkane group of the preferred di-halo alkane can be any of ethane, propane, pentane, hexane, heptane, octane, nonane, decane, undecane, or dodecane. A preferred alkane group is decane, and a preferred di-halo alkane is di-bromo decane. A preferred bifunctional phthalic acid is 5-(octadecyl) isophthalic acid.

Suitable microcrystalline crosslinking agents include Nylon-12, Nylon 6, and Nylon 66. The preferred Mw of the microcrystalline crosslinkers is less than 20,000, preferably less than 15,000, and most preferably less than 5000.

Crosslinking agents are preferably added to the polymerization mixture in an amount, per 100 pbw polymer, of between about 0.01 and 10 pbw crosslinker, more preferably between about 0.01 and 5 pbw, and most preferably between about 0.1 and 3 pbw.

The present polymers are contemplated as replacements for the conductive electrolyte solution in traditional electrolytic cells. Such an electrolytic cell would contain an anode and a cathode, preferably lithium based, and the present conductive polymers interposed therebetween.

The anode is typically comprised on a compatible anodic material which is any material which functions as an anode in a solid electrolytic cell. Such compatible anodic materials are well known in the art and include, by way of example, Li, Li alloys, such as alloys of Li with Al, Hg, Mn, Fe, Zn, intercalation based anodes such as those employing carbon, tungsten oxides, and the like. Particularly preferred anodes include lithium anodes employing carbon materials such as graphite, cokes, mesocarbons, and the like. Such carbon intercalation based anodes typically include a polymeric binder suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode also may include an electron conducting material such as carbon black.

The cathode is typically comprised of a compatible cathodic material (i.e., insertion compounds) which is any material which functions as a positive pole in an electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$, lithiated managanese oxides, e.g., $LiMn_2O_4$, lithiated nickel oxides, e.g., $LiNiO_2$, and mixtures thereof. Cathode-active material blends of $Li_xMn_2O_4$ (spinel) is described in U.S. Pat. No. 5,429,890 which is herein incorporated by reference. The blends can also include $Li_xMn_2O_4$ (spinel) and at least one lithiated metal oxide selected from Li $NiO_2$ and $Li_xCoO_2$ wherein $0<x\leq 2$.

In one alternative embodiment, the cathode is prepared from a cathode paste which comprises from about 35 to 65 weight percent of a compatible cathodic material; from about 1 to 20 weight percent of an electroconductive agent; from about 0 to 20 weigh percent of polyethylene oxide having a number average molecular weight of at least 100,000.

The present invention is described in more detail in the following non-limiting examples. These are presented for purposes of illustration only and are not to be construed in a limiting sense.

EXAMPLES

Example 1

To a Brabender mixer (~55 g capacity) equipped with a roller blade and $N_2$ purging was added 30 g ISOBAN™ 306 poly(isobutylene-co-maleimide) (Kuraray, LTD.; Tokyo, Japan). The mixer was initially set to 160° C. and 60 rpm. After 3 minutes, 25 g poly(ethylene glycol) methyl ether ($M_w$=350) (Aldrich; Milwaukee, Wis.) was added to the mixer. After another 5 minutes, 4.5 g $LiBF_4$ (Aldrich) was added to the mixer. The material was further mixed at those conditions for 18 minutes. Then, 1 g 1,10-dibromodecane (Aldrich) was added. After 5 minutes, agitation was stopped and the mixture removed from the mixer. The resulting material was an elastic gel.

Example 2

The procedure of Example 1 was repeated, except for a minor change in the charges of the materials. In this example, 15 g ISOBAN™ 306 copolymer, 44.5 g poly (ethylene glycol) methyl ether, 8 g $LiBF_4$, and 0.5 g 5-(octadecyl) isophthalic acid were added to the mixer. The resulting material was an elastic gel.

Example 3

Charges of 25 g ISOBAN™ 306 copolymer and 25 g poly(ethylene glycol) methyl ether were made to a Brabender mixer. The materials were mixed at 160° C. and 60 rpm for 36 minutes. Then, 0.8 g 1,10-dibromodecane was added. 4 minutes later, 3.0 g $LiBF_4$ was added. After another 4 minutes, agitation was stopped and the mixture removed from the mixer. The resulting materal was an elastic gel.

Example 4

The procedure of Example 3 was repeated with a minor change in the charges of the reactants. 25 g ISOBAN™ 306 copolymer, 25 g poly(ethylene glycol) methyl ether, 3.0 g $LiBF_4$, and 0.3 g 1,10-dibromodecane were added to the mixer. Before addition of the reactants, the ISOBAN™ 306 poly(ethylene glycol) methyl ether were premixed for two hours at room temperature. The premixed stock was then charged into the mixer. After 6 minutes, 1,10-dibromodecane and $LiBF_4$ were added. The total mix time was 20 minutes.

Example 5

The procedure of Example 4 was repeated, except for a change in the charges of the materials. 15 g ISOBAN™ 306 copolymer, 35 g poly(ethylene glycol) methyl ether, 3.3 g $LiBF_4$, and 0.5 g 1,10-dibromodecane were added to the mixer.

Example 6

The procedure of Example 4 was repeated, except for a change in the charges of reactants. 15 g ISOBAN™ 306 copolymer, 15 g poly(ethylene glycol) methyl ether, 3.4 g $LiBF_4$, and 1.0 g 1,10-dibromodecane were charged to the mixer.

Example 7

A Brabender mixer was set to 120° C. and 60° C. rpm prior to addition of 35 g ISOBAN™ 306 copolymer and 15 g poly(ethylene glycol)methyl ether. After 10 minutes, the temperature was adjusted to 180° C. After 4 minutes, 10 g Nylon-12 (Aldrich) was added. The material was mixed for 3 minutes, followed by addition of 1,10-dibromodecane. After 3 minutes, 3.3 g $LiBF_4$ was added. After 3 more minutes, agitation was stopped and the mixture removed from the mixer. The resulting material was an elastic gel.

Compounds with good conductivity are demonstrated. Moreover, electrical current resistance of less than or equal to $10^{-4}$ Ω is shown, as measured between 2 parallel disks of 25 mm diameter. The test gap was 2 mm. Both thermoplastic and thermosetting gels were formed by this procedure, as can be seen in the table summarizing this data below.

| | Shore A hardness | Gel Characteristic | Current Resistance Ω |
|---|---|---|---|
| 1 | 15 | Thermosetting | $1.8 \times 10^{-5}$ |
| 2 | 14 | Thermoplastic | $2.0 \times 10^{-5}$ |
| 3 | 20 | Thermosetting | $23 \times 10^{-5}$ |
| 4 | 18 | Thermosetting | $2.1 \times 10^{-6}$ |
| 5 | 5 | Thermosetting | $8 \times 10^{-4}$ |
| 6 | 11 | Thermosetting | $5 \times 10^{-5}$ |
| 7 | 24 | Thermoplastic | $4 \times 10^{-5}$ |

The invention has been described with reference to certain preferred embodiments. Modifications can be made without departing from the scope and spirit of the invention as defined in the appended claims.

We claim:

1. A conductive polymer gel composition comprising:
   a. a copolymer comprising alkenyl units and maleimide units;
   b. a crosslinking agent; and
   c. an electrolyte solution.

2. The composition of claim 1 wherein the alkenyl units are derived from monomers selected from the group consisting of vinyl-substituted aromatic hydrocarbons, $R^1R^2$ethylene, alkyl vinyl ether, and mixtures thereof.

3. The composition of claim 2 wherein said vinyl-substituted aromatic hydrocarbons are chosen from the group consisting of styrene, α-methylstyrene, 1-vinylnaphthalene, 2-vinyl-naphthalene, 1-α-methylvinylnaphthalene, 2-α-methylvinylnaphthalene, as well as alkyl, cycloalkyl, aryl, alkaryl, and aralkyl derivatives thereof, in which the total number of carbon atoms in the vinyl-substituted aromatic hydrocarbon is not greater than 18, di- or tri-vinyl-substituted aromatic hydrocarbons, and mixtures thereof.

4. The composition of claim 2 wherein said $R^1R^2$ethylene is selected from the group consisting of ethylene, propylene, butene, isobutylene, pentene, hexene, heptene, and mixtures thereof.

5. The composition of claim 2 wherein said alkyl vinyl ether is selected from the group consisting of methyl vinyl ether, ethyl vinyl ether, propyl vinyl ether, butyl vinyl ether, pentyl vinyl ether, hexyl vinyl ether, and an alkyl vinyl ether with up to 12 carbon atoms in the alkyl substituent, and mixtures thereof.

6. The composition of claim 1 wherein said maleimide is the reaction product of maleic anhydride and ammonia.

7. The composition of claim 1 wherein said maleimide is the reaction product of maleic anhydride and a primary amine.

8. The composition of claim 1 wherein said crosslinking agent comprises an alkane having at least two halogen substituents.

9. The composition of claim 1 wherein said crosslinking agent comprises a phthalic acid having at least bi-functionality.

10. The composition of claim 1 wherein said crosslinking agent is is selected from the group consisting of nylon-12, nylon-6, nylon-66 and mixtures thereof.

11. The composition of claim 1 wherein said electrolyte solution comprises an inorganic salt.

12. The composition of claim 11 wherein said inorganic salt is selected from the group consisting of lithium perchlorate, lithium tetrafluoroborate, lithium trifluoromethansulfonate, lithium hexafluorophosphate, lithium bistrifluoromethansulfonylamide lithium iodide, lithium bromide, lithium aluminum tetrachloride, lithium hexafluoroarsenate, lithium hexafluorophosphate, lithium tetramethyl borate, lithium oxide aluminium chloride complex salt, and mixtures thereof.

13. The composition of claim 1 wherein said conductive polymer gel composition has a resistance less than or equal to $10^{-4}$ ohms.

14. An electrolytic cell comprising an anode, a cathode, and a conductive polymer gel composition comprised of a copolymer having alkenyl units and maleimide units; a crosslinking agent; and an electrolyte solution.

15. The cell of claim 14 wherein said electrolyte solution comprises at least one inorganic salt.

16. The cell of claim 15 wherein said inorganic salt is selected from the group consisting of lithium perchlorate, lithium tetrafluoroborate, lithium trifluoromethansulfonate, lithium hexafluorophosphate, lithium bistrifluoromethansulfonylamide, lithium iodide, lithium bromide, lithium aluminum tetrachloride, lithium hexafluoroarsenate, lithium hexafluorophosphate, lithium tetramethyl borate, lithium oxide aluminium chloride complex salt, and mixtures thereof.

17. The cell of claim 14 wherein said conductive polymer gel composition has a current resistance less than or equal to $10^{-4}$ ohms.

18. The cell of claim 14 wherein the alkenyl units are derived from monomers selected from the group consisting of vinyl-substituted aromatic hydrocarbons, $R^1R^2$ethylene, alkyl vinyl ether, and mixtures thereof.

19. The cell of claim 14 wherein said crosslinking agent is selected from the group consisting of alkanes having at least two halogen substituents, nylon-13, nylon-6, nylon-66 and mixtures thereof.

20. A method for forming a conductive polymer gel composition comprising:
   a. forming a copolymer comprising alkenyl units and maleimide units;
   b. crosslinking said copolymer; and
   c. mixing said copolymer with an electrolyte solution so as to provide said conductive gel.

* * * * *